United States Patent
Larson et al.

(10) Patent No.: US 12,289,564 B2
(45) Date of Patent: Apr. 29, 2025

(54) VEHICULAR INTERIOR REARVIEW MIRROR ASSEMBLY WITH NEAR INFRARED LIGHT EMITTER AND DMS CAMERA AND LIGHT ABSORPTION FILTER

(71) Applicant: Magna Mirrors of America, Inc., Holland, MI (US)

(72) Inventors: Mark L. Larson, Grand Haven, MI (US); John T. Uken, Jenison, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 90 days.

(21) Appl. No.: 18/472,315

(22) Filed: Sep. 22, 2023

(65) Prior Publication Data

US 2024/0106986 A1  Mar. 28, 2024

Related U.S. Application Data (60) Provisional application No. 63/377,113, filed on Sep. 26, 2022.

(51) Int. Cl.

| | |
|---|---|
| *H04N 7/18* | (2006.01) |
| *B60R 1/04* | (2006.01) |
| *B60R 1/08* | (2006.01) |
| *B60R 1/12* | (2006.01) |
| *H04N 23/21* | (2023.01) |

(Continued)

(52) U.S. Cl.
CPC .................. *H04N 7/18* (2013.01); *B60R 1/04* (2013.01); *B60R 1/088* (2013.01); *B60R 1/12* (2013.01); *B60R 1/1207* (2013.01); *H04N 23/21* (2023.01); *H04N 23/57* (2023.01); *B60R 2001/1253* (2013.01); *G02B 5/3025* (2013.01)

(58) Field of Classification Search
CPC .......... H04N 7/18; H04N 23/21; H04N 23/57; G02B 5/3025; B60R 1/04; B60R 1/088; B60R 1/12; B60R 1/1207; B60R 2001/1253

See application file for complete search history.

(56) References Cited

U.S. PATENT DOCUMENTS

| | | |
|---|---|---|
| 6,690,268 B2 | 2/2004 | Schofield et al. |
| 7,184,190 B2 | 2/2007 | McCabe et al. |

(Continued)

*Primary Examiner* — Sath V Perungavoor
*Assistant Examiner* — Tyler B Edwards
(74) *Attorney, Agent, or Firm* — HONIGMAN LLP (57) ABSTRACT

A cabin monitoring system includes an interior rearview mirror assembly including a mirror head having a mirror reflective element that includes (i) a planar glass substrate, (ii) a transflective mirror reflector at the glass substrate and (iii) a light absorption film including a polarizer film. A camera accommodated by the mirror head views through the reflective element. A light emitter accommodated by the mirror head emits near infrared (NIR) light through the reflective element. The light absorption film attenuates greater than 60 percent of visible light and less than 30 percent of NIR light incident on the light absorption film and transmits less than 40 percent of visible light and greater than 70 percent of NIR light through the light absorption film. The camera captures image data representative of NIR light emitted through the reflective element and reflected from the interior cabin of the vehicle back through the reflective element.

34 Claims, 5 Drawing Sheets

(51) Int. Cl.
*H04N 23/57* (2023.01)
*G02B 5/30* (2006.01)

(56) References Cited

U.S. PATENT DOCUMENTS

| | | | |
|---|---|---|---|
| 7,195,381 | B2 | 3/2007 | Lynam et al. |
| 7,255,451 | B2 | 8/2007 | McCabe et al. |
| 7,274,501 | B2 | 9/2007 | McCabe et al. |
| 7,626,749 | B2 | 12/2009 | Baur et al. |
| 7,914,187 | B2 | 3/2011 | Higgins-Luthman et al. |
| 9,405,120 | B2 | 8/2016 | Graf et al. |
| 10,017,114 | B2 | 7/2018 | Bongwald |
| 10,065,574 | B2 | 9/2018 | Tiryaki |
| 10,958,830 | B2 | 3/2021 | Koravadi |
| 11,518,401 | B2 | 12/2022 | Kulkarni |
| 11,639,134 | B1 | 5/2023 | Huizen et al. |
| 11,780,372 | B2 | 10/2023 | Sobecki et al. |
| 11,827,153 | B2 | 11/2023 | Miller et al. |
| 2009/0040778 | A1* | 2/2009 | Takayanagi ............... B60R 1/30 362/494 |
| 2014/0336876 | A1 | 11/2014 | Gieseke et al. |
| 2015/0009010 | A1 | 1/2015 | Biemer |
| 2015/0015710 | A1 | 1/2015 | Tiryaki |
| 2015/0022664 | A1 | 1/2015 | Pflug et al. |
| 2015/0092042 | A1 | 4/2015 | Fursich |
| 2015/0232030 | A1 | 8/2015 | Bongwald |
| 2015/0294169 | A1 | 10/2015 | Zhou et al. |
| 2015/0296135 | A1 | 10/2015 | Wacquant et al. |
| 2015/0352953 | A1 | 12/2015 | Koravadi |
| 2016/0137126 | A1 | 5/2016 | Fursich et al. |
| 2016/0209647 | A1 | 7/2016 | Fursich |
| 2017/0217367 | A1 | 8/2017 | Pflug et al. |
| 2017/0274906 | A1 | 9/2017 | Hassan et al. |
| 2018/0099612 | A1* | 4/2018 | Weller ................... H04N 23/56 |
| 2018/0222414 | A1 | 8/2018 | Ihlenburg et al. |
| 2018/0231976 | A1 | 8/2018 | Singh |
| 2019/0045144 | A1* | 2/2019 | Reed ..................... G01J 5/0806 |
| 2019/0210615 | A1 | 7/2019 | Caron et al. |
| 2020/0143560 | A1 | 5/2020 | Lu et al. |
| 2020/0202151 | A1 | 6/2020 | Wacquant |
| 2020/0320320 | A1 | 10/2020 | Lynam |
| 2021/0291739 | A1 | 9/2021 | Kasarla et al. |
| 2021/0323473 | A1 | 10/2021 | Peterson et al. |
| 2022/0242438 | A1 | 8/2022 | Sobecki et al. |
| 2022/0254132 | A1 | 8/2022 | Rother |
| 2022/0377219 | A1 | 11/2022 | Conger et al. |

* cited by examiner

VEHICULAR INTERIOR REARVIEW MIRROR ASSEMBLY WITH NEAR INFRARED LIGHT EMITTER AND DMS CAMERA AND LIGHT ABSORPTION FILTER

CROSS REFERENCE TO RELATED APPLICATION

The present application claims the filing benefits of U.S. provisional application Ser. No. 63/377,113, filed Sep. 26, 2022, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle.

SUMMARY OF THE INVENTION

The present invention provides an interior rearview mirror assembly that includes a mirror head adjustably attached to a mounting structure. The mounting structure is configured to attach at an interior portion of a vehicle equipped with the interior rearview mirror assembly. The mirror head includes a mirror reflective element that includes a glass substrate, a transflective reflector layer disposed at a surface of the glass substrate, and a light absorption filter layer disposed behind the glass substrate and the transflective reflector layer. A camera is accommodated by the mirror head and is operable to capture image data. The camera views through the glass substrate, the reflector layer, and the light absorption filter layer. A light emitter is accommodated by the mirror head and is operable, when electrically powered to emit light, to emit infrared (IR) light or near infrared (NIR) light. The light emitter emits light through the glass substrate, the reflector layer, and the light absorption filter layer. The light absorption filter layer absorbs a portion of light that passes through the light absorption filter layer. When light passes through the light absorption filter layer, the light absorption filter layer absorbs a higher portion of visible light and a lower portion of IR light or NIR light. For example, the light absorption filter layer may absorb more than 50 percent of visible light and less than 15 percent of IR light or NIR light. Thus, with the mounting structure attached at the interior portion of the vehicle and when the light emitter is electrically powered to emit light, the camera captures image data representative of emitted IR light or NIR light reflected from objects at the interior portion of the vehicle.

The light absorption filter layer may include one or more polarizer film layers. For example, the light absorption filter layer may include one linear polarizer film layer. The light absorption filter layer may include two linear polarizer film layers. The light absorption filter layer may include a circular polarizer film layer.

These and other objects, advantages, purposes and features of the present invention will become apparent upon review of the following specification in conjunction with the drawings.

DESCRIPTION OF THE PREFERRED EMBODIMENTS

Figure 1:
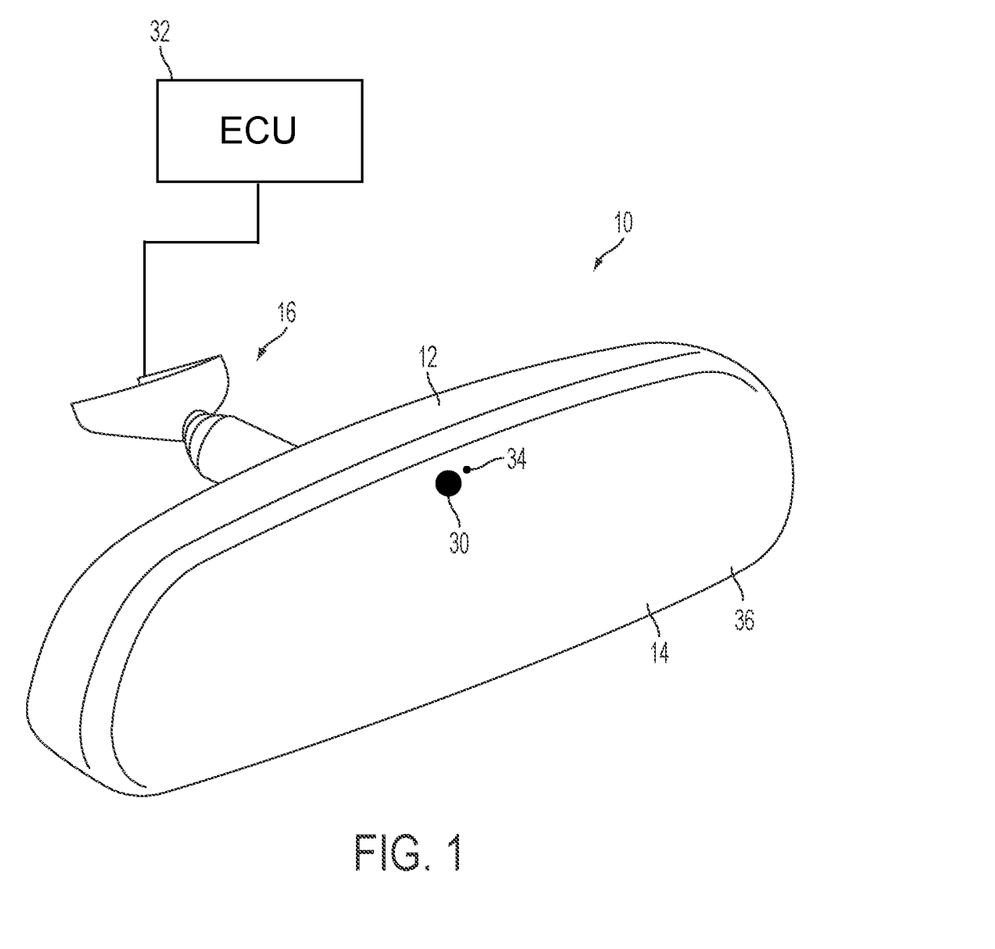
FIG. 1 is a perspective view of an interior rearview mirror assembly having a camera accommodated by the mirror head and viewing through the mirror reflective element of the interior rearview mirror assembly.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. When the mirror assembly 10 is mounted at the interior portion of the vehicle, the mirror reflective element 14 provides a field of view to the driver of the vehicle at least rearward of the vehicle, such as through a rear window of the vehicle. The mirror reflective element 14 may comprise any suitable construction. For example, the mirror reflective element 14 may comprise a variable reflectance mirror reflective element that varies its reflectance responsive to electrical current applied to conductive coatings or layers of the reflective element. The mirror assembly may include an electrochromic self-dimming mirror or a prismatic manual dimming mirror that may be toggled or flipped or adjusted between a daytime reflectivity position and a nighttime reflectivity position. Optionally, the mirror reflective element 14 may comprise a dual-mode interior rearview video mirror that can switch from a traditional reflection mode to a live-video display mode.

Figure 2:
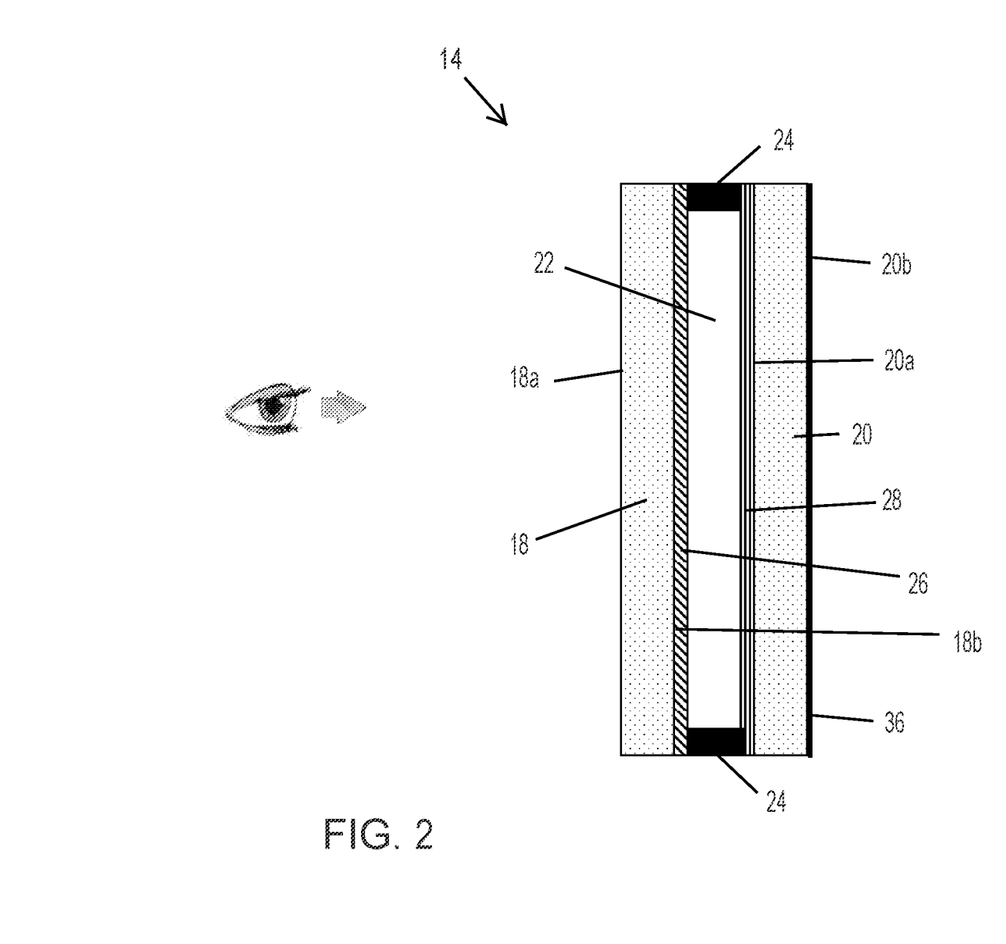
FIG. 2 is a sectional view of the mirror reflective element and light absorption filter of the mirror assembly of FIG. 1.

In the illustrated embodiment, and as shown in FIG. 2, the mirror reflective element 14 may comprise a laminate construction variable reflectance electro-optic (such as electrochromic) reflective element assembly having a front substrate 18 and a rear substrate 20 with an electro-optic medium 22 (such as electrochromic medium) sandwiched therebetween and bounded by a perimeter seal 24. As shown in FIG. 2, the front substrate 18 has a front or first surface 18a (the surface that generally faces the driver of a vehicle when the mirror assembly is normally mounted at the vehicle) and a rear or second surface 18b opposite the front surface 18a, and rear substrate 20 has a front or third surface 20a and a rear or fourth surface 20b opposite the front surface 20a, with the electro-optic medium 22 disposed between the second surface 18b and the third surface 20a and bounded by the perimeter seal 24 of the reflective element. The second surface 18b has a transparent conductive coating 26 established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface 20a has a metallic reflector coating 28 (or multiple layers or coatings) established thereat. The front or third surface 20a of rear substrate 20 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element)). The reflector may include a multilayer dielectric mirror or a metal thin film.

As described further below, a light absorption layer or filter or film 36 is disposed behind the reflector 28 to hide components and structure disposed behind the mirror reflective element 14 within the mirror casing 12. That is, the glass substrates and the conductive layers and electro-optic medium of the transflective mirror reflective element 14 may allow a portion or percentage of visible light to pass through (as compared to the portion of light that is reflected to provide the view to the driver of the vehicle and/or that is attenuated by the respective layers), making components that are disposed behind the mirror reflective element 14 and within the mirror casing 12, such as cameras, sensors, or mounting structure, potentially visible to the driver or occupants of the vehicle. This may result in an undesirable appearance and interfere with or distract from the reflected view provided by the mirror assembly. The absorption filter 36 is disposed behind the mirror reflector 28, such as at the third surface 20a or fourth surface 20b of the mirror reflective element 14, to absorb or attenuate a portion or percentage of the light that passes through the mirror reflective element 14 to hide the components and provide a uniform look across the viewing surface of the reflective element 14. Furthermore, the absorption filter 36 is configured to permit a portion or percentage (e.g., a relatively low percentage such as 60 percent, 50 percent, 40 percent, or less) of light in the visible spectrum to pass through the absorption filter 36, and to permit a portion or percentage (e.g., a relatively high percentage such as 80 percent, 90 percent, or more) of light in the infrared (IR) or near IR spectrum to pass through the absorption filter 36. The absorption filter 36 may include one or more polarizer layers or films, such as a linear polarizer or a circular polarizer.

As shown in FIG. 1, a camera 30 is positioned behind the mirror reflective element 14 and views through the mirror reflective element 14 to capture image data representative of the interior cabin of the vehicle. For example, the camera 30 may have a field of view of at least a head region of the driver of the vehicle or the camera 30 may provide a wide angle view of the driver and occupants of the vehicle. The captured image data may be processed at an electronic control unit (ECU) 32 disposed at the vehicle and having electronic circuitry and associated software so that the ECU 32 may provide the processed image data to one or more systems of the vehicle. For example, the ECU 32 may process the captured image data to provide a cabin monitoring system or driver monitoring system or occupant monitoring system, or to enable video calling or the like. The data transfer or signal communication from the camera 30 to the ECU 32 may comprise any suitable data or communication link, such as a vehicle network bus or the like of the equipped vehicle.

The camera 30 may be configured to image both the visible and IR or near IR portions of the light spectrum. That is, the camera 30 may be configured to capture visible light image data representative of visible light and IR or near IR image data representative of IR or near IR light. This type of dual spectra camera can see well at night with the use of IR or near IR illumination within the vehicle cabin and can also be used during the day when there is sufficient visible light to use the camera's full color (i.e., visible light spectrum) capabilities, such as for video phone calls or selfies (i.e., still images). Thus, an IR or near IR illumination device 34 that emits IR or near IR light when electrically operated may be disposed within the vehicle, such as at the interior rearview mirror assembly 10 and/or behind the mirror reflective element 14 (and emitting the IR or near IR light through the mirror reflective element when electrically operated). For example, the IR illumination device 34 may include IR or near IR light emitting diodes (LEDs) within the mirror casing 12 and behind the mirror reflective element 14. When the IR illumination device 34 emits the IR or near IR light, the camera 30 is operable to capture image data representative of the IR or near IR light reflected off of occupants and objects within the vehicle cabin. The system and camera and light emitters may utilize aspects of the systems and cameras and light emitters described in International Publication Nos. WO 2023/034956; WO 2022/241423 and/or WO 2022/187805, which are hereby incorporated herein by reference in their entireties Because of visible light absorbed by or attenuated by the light absorption filter 36, the camera 30 positioned behind the mirror reflective element 14 may be invisible or at least partially hidden from view of the user. That is, when the driver or occupants within the vehicle view the interior rearview mirror assembly 10, they may only (or primarily) see the mirror reflective element 14 (i.e., the reflection or view provided by the mirror reflective element) and they may not be able to view the camera 30 that is disposed behind the mirror reflective element 14. For example, the camera 30 may be disposed behind a reflector, a thin-film-transistor liquid crystal display (TFT display), and a darkened window area of the mirror assembly 10 to hide presence of the camera 30. Thus, the camera 30 is hidden from view of the driver and occupants of the vehicle and maintains the ability to capture image data through the mirror reflective element 14. In other words, visible light and IR or near IR light may still pass through the mirror reflective element 14 for imaging by the camera 30 even though the camera 30 is hidden or at least partially hidden from view of the driver and occupants in the vehicle.

As described further below, hiding the camera 30 and optimizing its transmission path through the mirror reflective element 14 is very important. That is, where the camera is configured to view both visible light and IR or near IR light, the transmission of light through the mirror reflective element 14 to be captured by the camera is balanced with hiding the camera from view of vehicle occupants, and balancing the ratios of visible and IR or near IR light that is transmitted to the camera, ensuring that the best possible light is relayed through various optical layers to maximize illumination of the vehicle cabin with IR or near IR LEDs disposed behind the reflective layer.

The interior rearview mirror assembly 10 having one or more IR or near IR illumination devices 34 disposed behind the mirror reflective element 14 (i.e., within the mirror casing 12 and emitting IR or near IR light, when electrically operated, through the mirror reflective element 14) maximizes IR light transmission through the absorption filter 36 and mirror reflective element 14 to minimize the amount of LED heat needed to properly illuminate the vehicle cabin. That is, the amount of light emitted by the illumination device 34 that is allowed to pass through the mirror reflective element 14 to illuminate the vehicle cabin is maximized so that a minimum amount of heat is generated at the interior of the mirror assembly 10 from operating the illumination device 34. Heat management is one of the highest priorities for a small container like the interior rearview mirror. Thus, the absorption filter 36 and mirror reflective element 14 allows transmission of a relatively high percentage of IR or near IR light from the LEDs and through the mirror reflective element 14 (such as 80 percent, 90 percent, 95 percent or more). At the same time, the absorption filter 36 and mirror reflective element 14 allows passage of a relatively high percentage of the reflected IR or near IR light from the interior cabin surfaces or occupants back through the same mirror optical path (such as 80 percent, 90 percent, 95 percent or more).

Furthermore, the absorption filter 36 and mirror reflective element 14 manipulates the visible portion of the light spectrum to help hide the camera 30 and surrounding structure from the vehicle occupants. For example, hiding the camera 30 can be accomplished using a multilayer dielectric reflector. However, these solutions may have variations in light transmission depending on the viewing angle of the occupant relative to the mirror reflective element. That is, multilayer dielectric films may have different levels of optical transmission for different angles of incidence. Thus, multilayer dielectric films may hide the camera very well from an occupant with a viewing angle that is perpendicular relative to the mirror reflective surface (as might be encountered by the driver of the vehicle), and they may not hide the camera as well at angles of incidence other than normal (as might be encountered by occupants having viewing angles from different seating positions in the vehicle).

In the illustrated example of FIG. 1, the camera 30 is centrally located in the mirror and, when the mirror assembly 10 is mounted at the interior portion of the vehicle, the mirror is positioned substantially along the center of the vehicle. This vantage point serves as a high location which can provide a clear line of sight for the camera 30 into both the front and rear rows of seats of the vehicle. The camera 30 may include a wide angle optical lens to provide the desired wide angle view of the interior portion of the vehicle. Thus, at the high and central mounting position of the interior rearview mirror assembly 10, the mirror reflective element 14 may be viewed by different vehicle occupants having different viewing angles. Therefore, many of the vehicle occupants may not view the mirror reflective element 14 at a viewing angle that is perpendicular to the reflector. When the camera is only hidden behind a mirror reflective element having a dielectric film and not including the absorption filter, this may allow some vehicle occupants to see the camera behind the reflective element 14 more easily than other vehicle occupants in different seating locations.

Dyes or pigments may be added to plastic films (i.e., dyed absorbing films) to alter the transmission of visible, IR, and near IR light through the film. For example, dyes may absorb light and pigments may rely on absorption and scattering of light. Dyed absorbing films may not exhibit the same type of changes in light transmission as a viewer moves off of perpendicular to them as compared to dielectric films. That is, when compared to dielectric films, dyed absorbing films may have more uniform levels of light transmission across different viewing angles, but will still have different transmissions at different angles of incidence. Beer-Lamberts law dictates that the attenuation of light passing through a dyed absorbing film with a uniform absorbance/attenuation varies with the cosine of the angle of incidence. Thus, the change in transmission is not as abrupt as in multilayer dielectric films and instead increases as the angle of incidence moves further from perpendicular relative to the viewing plane. Thus, if the hiding ability of the dyed absorbing film is acceptable at a perpendicular viewing angle, then the hiding ability of the dyed absorbing film only improves as the viewing angle moves away from perpendicular viewing.

Furthermore, a dark opaque film layer may be adhered to the back of the interior rearview mirror transflective reflector (e.g., at the fourth surface 20b in FIG. 2) to hide components behind the reflective element 14 while providing a minimal amount of light transmission through the opaque layer. For example, a video mirror having a video display screen behind the transflective reflector may include an opaque film behind the reflector to hide the video display from view when the video display is in an off state. While an opaque film may be an effective filter that may hide the camera, an opaque film may provide only a fraction of a percent of light transmission and little to no light reflection, thus requiring more intense illumination from behind the opaque film to provide IR or near IR imaging. In other words, the opaque film may hide the camera but restricts IR or near IR imaging and/or requires high energy (i.e., high heat) LEDs for imaging.

Moreover, continuous optical bonding of films or mechanical mounts to the back of transflective mirrors is important to create a continuous optical interface condition which eliminates differences in reflection or color that may be observed by occupants looking at the reflector where diffuse ambient light is present. In other words, if a film or other material disposed at the transflective mirror reflective element 14 does not span the entire surface of the mirror reflective element, shadows or differences in reflection may be visibly apparent to the driver or occupants of the vehicle. Thus, the absorption filter 36 disposed at the mirror reflective element 14 to hide the camera 30 spans substantially the entirety of the surface (e.g., the third surface 20a or the fourth surface 20b) of the mirror reflective element 14 (such as 75 percent of the surface or more, 80 percent of the surface or more, 90 percent of the surface or more, 95 percent of the surface or more, and the like).

Thus, the absorption filter 36 is disposed at the mirror reflective element 14 to control or limit transmission of light from exterior the mirror assembly 10 through the mirror reflective element 14 to the camera 30 and from the illumination device 34 through the mirror reflective element 14 to illuminate the interior portion of the vehicle. The absorption filter 36 may be disposed at any suitable position within the mirror assembly 10 and in front of the camera 30, such as at the fourth surface 20b of the mirror reflective element 14 (FIG. 2). As discussed further below, the mirror reflective element 14 and absorption filter 36 provides a balance between a mirror element that has high enough reflection to serve as a visible mirror for use as a rearview automotive mirror (e.g., greater than 45 percent reflectivity, or greater than 55 percent reflectivity, such as greater than 65 percent reflectivity) and an absorption filter optically coupled to the back of the mirror element with enough transmission that the color camera may receive enough visible light to generate color image data and at the same time absorb the remaining visible light as it undergoes one or more reflections between the camera lens and the surrounding structure and the mirror reflector 28. For example, an absorption filter 36 that permits between 30 percent and 55 percent of light transmission in the visible range combined with a mirror reflector 28 having a reflectivity greater than 45 percent may sufficiently hide the camera 30 and other components.

Hiding the camera 30 behind the mirror reflective element 14 requires low visible light spectral transmission and efficient IR and near IR light transmission at the wavelength of light emitted by the illumination device 34. The IR or near IR light passes through the filter 36 of the mirror reflective element 14 twice. First, when the light is emitted by the illumination device 34 and passes through the mirror reflective element 14 to illuminate the interior portion of the cabin, and second, when the light is reflected from an object or occupant and passes through the mirror reflective element 14 and filter 36 and is detected by the camera 30. Minimizing the absorption level of IR and near IR light by the absorption filter 36 increases the efficiency of the illumination device 34 as less energy is needed to provide the requisite level of illumination for IR and near IR imaging. Thus, the absorption filter 36 provides ultra-low absorption in the IR and near IR spectral range to maintain high efficiency while minimizing the heat generated by the illumination device 34 when operating to emit the IR supplemental illumination.

For example, the absorption filter 36 may have a step function where it provides flat transmission (i.e., relatively equal transmission of light through the filter for a range of light wavelengths) across the visible spectrum of light and also provides flat spectral response in the near IR light range having wavelengths between 800 nanometers and 1,100 nanometers. The illumination device 34 may include a near IR LED emitting light at any suitable wavelength in an IR or near IR range, such as 880 nanometers or 940 nanometers or the like, and the filter 36 may have high transmission (such as 90 percent or 95 percent or more) for the IR or near IR range that includes the wavelength of the illumination device 34.

The wavelength of light emitted by the illumination device 34 and the corresponding range of wavelengths for which the filter 36 has high transmission rates may be dictated by the camera 30 or system of the vehicle. For example, a driver monitoring system may use 940 nanometer wavelength light to ensure the human eye of the driver cannot perceive even the smallest amount of reddish light coming from the near IR LEDs. That is, the IR light emitter may emit light having a wavelength of about 940 nanometers and the camera may be configured to capture image data representative of light in a range of wavelengths that includes 940 nanometers.

Furthermore, the filter 36 allows some spectrally flat visible light transmission so that the camera 30 may capture visible light and produce color image data, such as for video conferencing and the like. For example, the absorption filter 36 may permit between 35 percent and 55 percent or any suitable amount of light in the visible portion of the spectrum to pass through the absorption filter 36. Moreover, because the camera 30 is imaging the cabin interior via the light passing through the absorption filter 36, the filter 36 is low light scattering and thus does not include pigments which tend to scatter light.

Thus, because the camera 30 is disposed behind the mirror reflective element 14 having the absorption filter 36 with low visible light attenuation, the filter 36 in conjunction with the mirror reflective element 14 hides the camera 30 from vehicle occupants. Ambient visible light is reflected by the reflector 28 and the portion of visible light which is transmitted through the transflective reflector 28 is then at least partially absorbed by the filter 36 as it passes through. Any visible light that does pass through the filter 36 may then reflect off the camera lens and surrounding surfaces in the mirror casing 12 and is then passed through the absorbing filter 36 again before interacting with the transflective reflector 28, causing some of the reflected light to be transmitted through the reflector 28 toward the driver and some to be reflected back into the absorption filter 36 where it is again at least partially absorbed and follows the reflection process until the amount of light is irrelevant.

Thus, the absorption filter 36 comprises an optimized combination of optical and durability requirements for the rearview mirror assembly 10. The filter 36 may comprise a specialized polymer film with high optical standards and an optical grade pressure sensitive adhesive adhering and optically coupling the filter 36 at the back of the mirror reflective element 14.

For example, the absorption filter 36 may include one or more polarizer film layers. The polarizer may include a polymer film that is permanently bonded to the mirror reflective element 14 using a high quality optical acrylic pressure sensitive adhesive applied to the polarizer. Polarizers may be produced economically and with high optical quality and durability. Polarizer films may create a linear polarization or a circular polarization. The polarizer film may include an iodine type or a dye type. Both types are durable and consistent and may be manufactured according to demanding quality expectations. Furthermore, the polarizer film may neutrally transmit color across the visible spectrum, as used by the camera 30 when capturing visible light image data. Neutral color by definition means that the spectral transmission in the visible band from about 400 nanometers to 760 nanometers is relatively flat. For example, a linear polarizer film may provide 50 percent transmission for randomly polarized visible light. A linear display polarizer may provide transmissions between 40 percent and 48 percent with polarization efficiencies of 99.9 percent or more. Thus, polarizer films may provide optimized optical performance for visible light. When light is outside the visible light spectrum, such as at wavelengths greater than about 750 nanometers or more, the linear polarization effects of the polarizer film abruptly stop and optical transmission of the light is then dictated by the optical transmission of the high quality materials comprising the polarizer.

Figure 3:
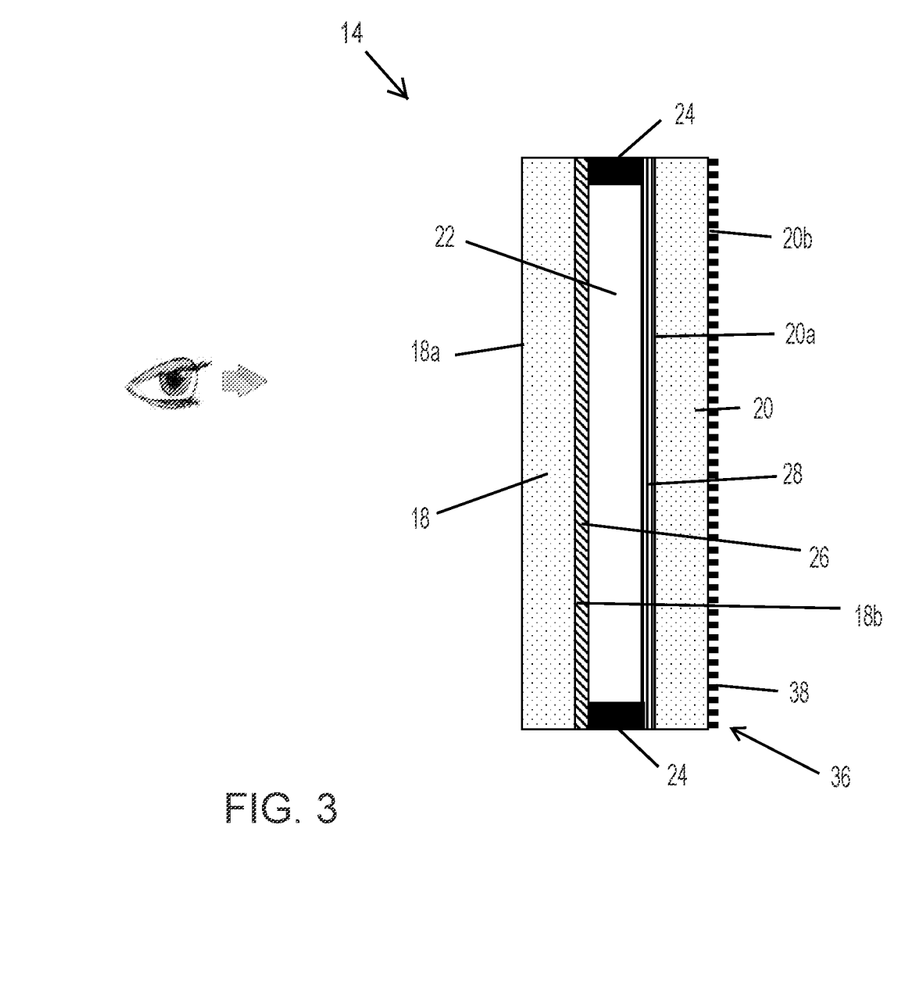
FIG. 3 is a sectional view of the mirror reflective element and light absorption filter where the light absorption filter includes a first linear polarizer film.

As shown in FIG. 3, in some implementations, an absorption filter 36 includes a single or first layer of linear polarizer film 38, which transmits about 45 percent of light in the visible spectrum (i.e., having wavelengths between about 400 nanometers and 750 nanometers) and about 80 percent, or 90 percent, or more of the light in the IR or near IR spectrum (e.g., having wavelengths between about 800 nanometers and 1,100 nanometers). The first layer of linear polarizer film 38 may be disposed at the third surface 20a or the fourth surface 20b of the rear glass substrate 20. Thus, the filter 36 including the first polarizer film 38 provides a high pass filter with a very abrupt step function just outside of the visible range. This linear polarizer provides filter properties required for the interior rearview mirror assembly 10 having the visible and IR or near IR camera 30 and illumination device 34. That is, the transmission characteristics of the filter 36 are flat in the visible range so color will not be distorted when passed through the mirror reflective element 14 to the color camera and the transmission characteristics at the driver monitoring system LED wavelengths (e.g., IR or near IR wavelengths, such as 880 nanometers or 940 nanometers and the like) may permit about 90 percent or more of IR or near IR to pass through the mirror reflective element 14 for imaging by the IR or near IR camera.

Figure 4:
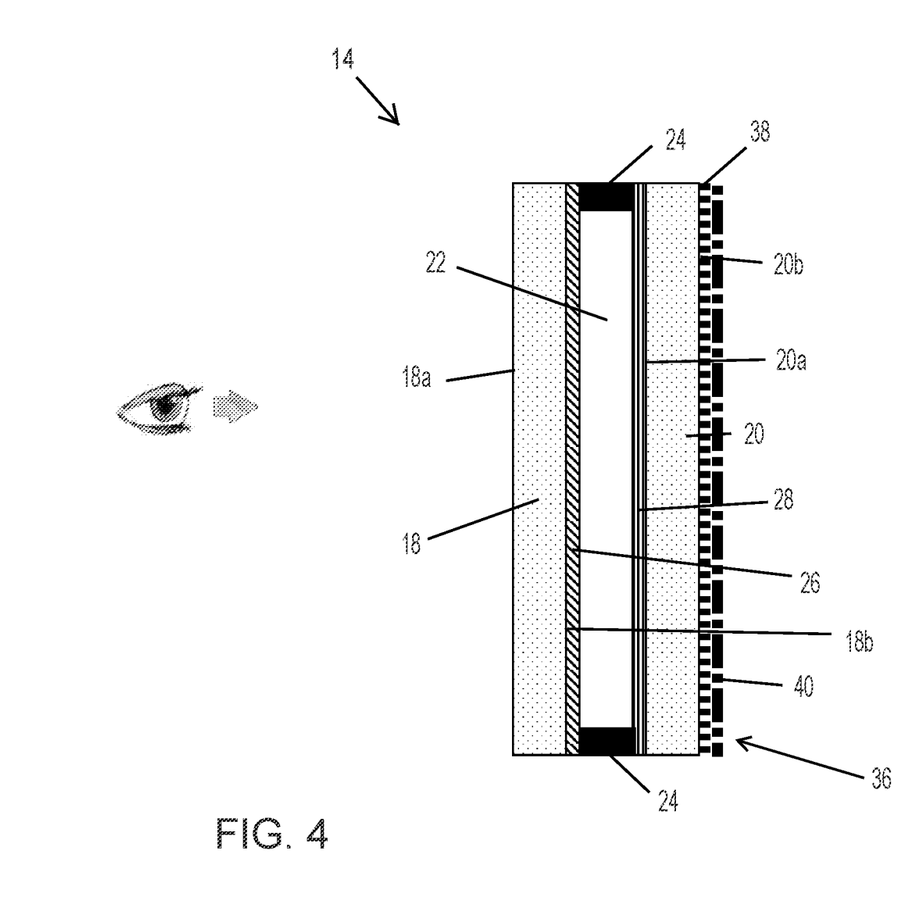
FIG. 4 is a sectional view of the mirror reflective element and light absorption filter where the light absorption filter includes a first linear polarizer film and a second linear polarizer film.

Because the transmission of visible light through one linear polarizer may be limited to about 45 percent or more, in some limitations, the absorption filter 36 may include a second layer of polarizer film 40 stacked with the first layer of polarizer film 38 (FIG. 4). In other words, the first layer of linear polarizer film 38 may be disposed at the third surface 20a or the fourth surface 20b and the second layer of linear polarizer film 40 may be disposed at the first layer, or at the other of the third surface 20a and the fourth surface 20b. The absorption filter 36 including two linear polarizer films leverages the linear polarization properties of each film to provide lower light transmission than is possible with a single polarizer film. For example, if two linear polarizer films are disposed at the rear of the mirror reflective element 14 with their respective optical transmission axes perpendicular to one another, the absorption filter 36 may provide zero visible light transmission. If two linear polarizer films are disposed with their optical transmission axes parallel to one another, visible light transmission of the absorption filter may be about 40 percent or less. Aligning the optical transmission axes of the two polarizers between 0 and 90 degrees relative to one another provides infinitely variable visible light transmission between about 40 percent and 0 percent, respectively. Furthermore, the crossed polarizer absorption filter 36 maintains the flat spectral transmission that a single polarizer film creates and will allow any nominal value of visible light transmission between 0 and 40 percent. The visible light transmission may be customized by adjusting the optical axes of the first polarizer film 38 and the second polarizer film 40 without requiring new materials or construction. The absorption filter 36 including the first and second polarizer films may provide relatively high IR or near IR light transmission rates (such as 80 percent or more, 90 percent or more, and the like).

Thus, some examples include the absorption filter 36 having the first polarizer film 38 and the second polarizer film 40. The absorption filter 36 may be disposed at the rear surface of the mirror reflective element 14 and in front of the camera 30 so that the camera 30 views through the mirror reflective element 14 and the absorption filter 36. The absorption film 36 permits about 90 percent of IR or near IR light to pass through so that the camera may be operable to perform IR or near IR imaging. The first polarizer film 38 has a first optical axis of light transmission and the second polarizer film 40 has a second optical axis of light transmission. The respective axes of the polarizer films may be disposed at any suitable angle (e.g., any suitable oblique angle) between parallel (i.e., the axes are at 0 degrees relative to one another) and perpendicular (i.e., the axes are at 90 degrees relative to one another). Thus, the absorption filter 36 may permit between about 40 percent and 0 percent of visible light to pass through (i.e., the absorption filter may attenuate between about 60 percent and 100 percent of visible light incident on the filter). In some examples, the absorption filter 36 may permit at least about 10 percent or 20 percent or 30 percent of visible light to pass through, but the absorption filter permits no more than about 40 percent of visible light to pass through, so that the camera may perform color imaging, while the camera 30 may be hidden from view of the driver and occupants within the vehicle, and the absorption filter 36 may allow about 90 percent or more of IR or near IR light to pass through to maintain efficiency and low heat operation of the illumination device 34. In other words, the absorption filter 36 may attenuate a portion of visible light incident thereat to at least partially hide the camera 30 disposed behind the absorption filter 36 while allowing a portion of visible light to pass through the absorption filter for imaging by the camera 30. Optionally, the camera 30 may perform only IR or near IR imaging, where the respective axes of the polarizer films may be disposed substantially perpendicular to one another to attenuate substantially 100 percent of visible light incident thereat while permitting about 90 percent or more of IR or near IR light to pass through Each linear polarizer film may attenuate at least 30 percent or more, 40 percent or more, 55 percent or more, and the like of visible light incident thereat so that the respective linear polarizer films of the absorption filter combine to attenuate at least 60 percent or more, 70 percent or more, 90 percent or more, and the like of visible light incident at the absorption filter 36. That is, the respective axes of the linear polarizer films may be angled relative to one another so that the absorption filter 36 attenuates at least 60 percent or more, 70 percent or more, 90 percent or more of visible light incident at the absorption filter 36 while permitting 80 percent or more, 90 percent or more, and the like of IR or near IR light to pass through the absorption filter. Put another way, the linear polarizer films are angled relative to one another to attenuate a larger portion of visible light incident at the absorption filter than what would be attenuated by just one of the linear polarizer films.

To achieve a specific optical transmission of the absorption filter 36 having the first polarizer film 38 and the second polarizer film 40, the optical transmission axes of the films may be adjusted relative to one another while the optical transmission through the filter 36 is monitored in real-time. When the desired transmission properties are achieved, the two polarizer films may be laminated together to set the transmission ratio of the absorption filter 36. This process may be performed with polarizer film blanks, where the polarizers have not been cut or formed to fit the mirror reflective element 14 and, after the absorption filter 36 is laminated together, the desired shape may be cut or formed from the laminated blank.

In other words, alignment of two linear polarizer blanks relative to each other to achieve a very specific optical transmission could be done using real-time transmission monitoring while adjusting the angle between the transmission axes and then laminating the two polarizers together to achieve a very specific optical transmission with a tight tolerance. Once the blanks are laminated together, their combined optical transmission is very stable and a mirror filter may be die cut from the blank without concern for the optical axis of the combined parts changing the filters transmission properties in both the visible and IR or near IR portions of the spectrum.

Furthermore, neither iodine nor dye based linear polarizers polarize near IR light having wavelengths in the range of about 800 nanometers to 1,100 nanometers. This is especially useful when IR LEDs are used behind the polarizing film to illuminate the vehicle cabin interior. Thus, IR and near IR light leaves the mirror unpolarized. As the IR or near IR light interacts with various surfaces within the vehicle cabin, it may develop a selective polarization upon reflection. Because the absorption filter 36 having one or more linear polarizer films has no polarization property in the IR or near IR range, any selective polarization that may happen when the light is reflected from a surface should not affect the light's ability to pass through the absorption filter 36. Thus, all IR and near IR light should pass through the polarizers of the absorption filter 36 equally well and independent of its polarization when the one or more polarizers include iodine or dye based linear polarizers.

Figure 5:
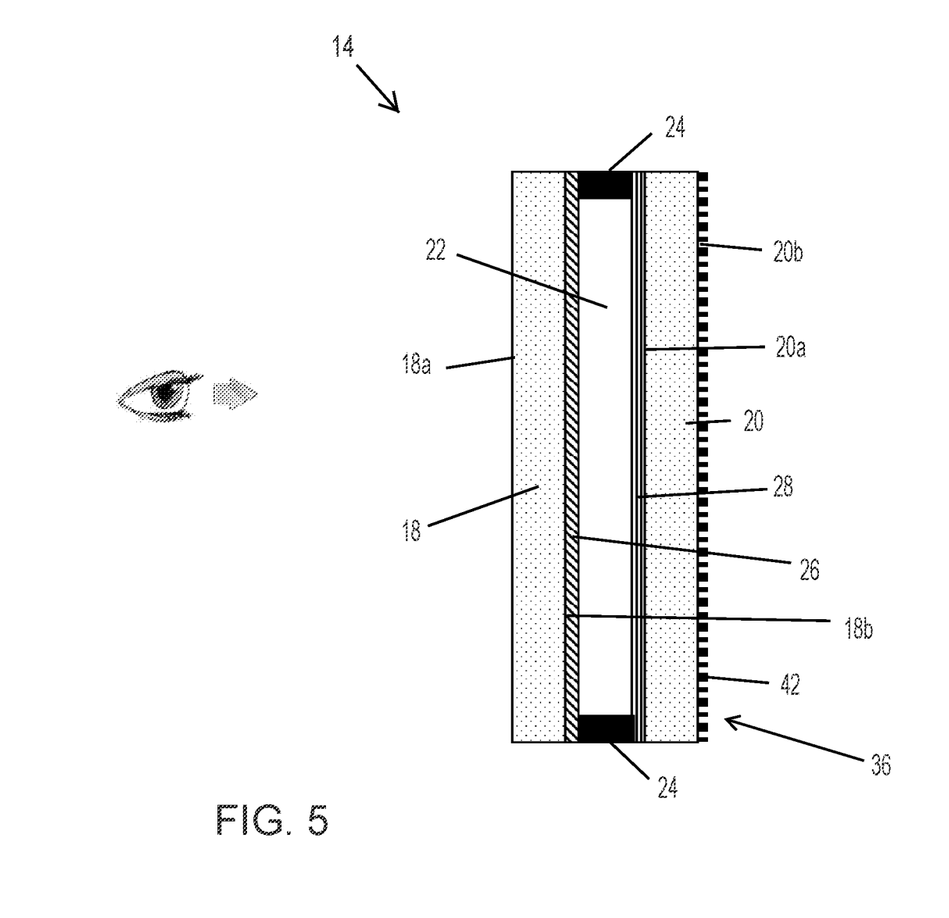
FIG. 5 is a sectional view of the mirror reflective element and light absorption filter where the light absorption filter includes a circular polarizer film.

As shown in FIG. 5, in some examples, the absorption filter 36 includes a circular polarizer film layer 42 disposed at the third surface 20a or the fourth surface 20b of the rear substrate 20. The circular polarizer 42 may have a visible light transmission level that is lower than the linear polarizers while having an IR or near IR light transmission level that is similar or equal to the linear polarizers. Thus, the circular polarizing film may be advantageous for hiding objects behind the mirror reflective element 14 if transmission in the visible range is not critical. For example, if the camera 30 only performs IR or near IR imaging and does not capture visible light image data, the circular polarizer 42 may be used to block or attenuate a high percentage of visible light while permitting a high percentage of IR or near IR light to pass through the absorption filter 36.

As ambient light passes through the circular polarizer, the absorption filter converts the randomly polarized ambient light into circularly polarized light. When the circularly polarized light hits a surface behind the filter 36, such as the camera lens or surrounding structure, it will be reflected as circularly polarized light with circular polarization opposite of the incident light. As this reflected light interacts with the circular polarizer, it will be absorbed or attenuated and thus will minimize the ability for vehicle occupants to see objects behind the transflective mirror element.

The circular polarizer provides efficient polarization in the visible light range. Similar to the linear polarizer, the circular polarizer 42 does not polarize light in the IR or near IR light range, such as light having a wavelength of greater than 800 nanometers. Thus, the absorption filter 36 including the circular polarizer 42 will pass all polarizations of IR and near IR light in and out of the mirror with at a transmission rate of about 90 percent or more.

The polarizer films may also be included in mirror assemblies having liquid crystal displays (LCDs), such as an LCD used to provide a display screen behind the mirror reflective element 14, where the camera and/or the IR light emitter are disposed behind the LCD such that the camera views through the LCD and the light emitter emits light through the LCD. For example, the LCD screen may include a polarizer film bonded to the front or first side of the LCD screen and a polarizer film bonded to the rear or second, opposite side of the LCD screen. The polarizer films disposed on the LCDs may create a linear polarization or a circular polarization, and they are optimized for visible light and more specifically, the visible light range of full color LCDs and backlights.

For example, the absorption filter 36 may use advanced and high performance dye based linear polarizers for in-plane switching (IPS) thin film transistor LCDs. These high durability dye type polarizers (such as a GHC polarizer commercially available from Nippon Kayaku of Tokyo, Japan) are very durable and have been specifically designed for extremely harsh automotive displays. They are very stable.

Furthermore, LCDs made with iodine based linear polarizers may have IR or near IR light transmission of 45 percent or more through a full display. Thus, the LCD has areas of very high transmission for IR and near IR (color filter subpixels) and other areas which are opaque (black mask and metallization) to IR and near IR. Therefore, iodine polarizers may have very high transmission to IR and near IR light and little to no polarization efficiency in the IR or near IR range of wavelengths of 800 nanometers to 1,100 nanometers.

Thus, the interior rearview mirror assembly that includes a driver monitoring camera that captures IR or near IR light and an associated illumination device or IR light emitter includes a mirror reflective element that permits IR or near IR light to pass through while blocking or absorbing visible light so as to hide the camera and light emitter behind the mirror reflective element. The mirror assembly includes the mirror head adjustably attached to a mounting structure, the mounting structure configured to attach at an interior portion of the vehicle, such as the headliner of the vehicle or the in-cabin surface of the windshield. The mirror head includes the mirror reflective element that includes at least a glass substrate, a transflective reflector layer disposed at the glass substrate and the light absorption filter layer disposed behind the reflector layer. Thus, the camera accommodated by the mirror head views through the glass substrate, the reflector layer, and the light absorption filter layer. The light emitter, which when electrically operated emits IR light or near IR light, emits light through the glass substrate, the reflector layer, and the light absorption filter layer. The light absorption filter layer absorbs a portion of light that passes through the light absorption filter layer and absorbs a higher portion of visible light and a lower portion of IR light or near IR light. For example, the filter layer may absorb 35 percent, 40 percent, 50 percent, 60 percent or more light in the visible spectrum that passes through the absorption filter layer. The filter layer may absorb 15 percent, 10 percent or less light in the IR or near IR spectrum that passes through the absorption filter layer. Thus, when the light emitter is electrically powered to emit IR or near IR light, the light passes through the absorption filter layer and mirror reflective element at a high rate, reflects off of objects in the interior cabin of the vehicle, and passes back through the absorption filter layer and mirror reflective element at a high rate to be captured by the camera performing IR or near IR imaging. Furthermore, the light absorption filter absorbs a high percentage of visible light to hide the camera and light emitter behind the mirror reflective element.

The mirror assembly may include a camera or sensor or light of a driver monitoring system and/or head and face direction and position tracking system and/or eye tracking system and/or gesture recognition system. Such head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-

0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2023/034956; WO 2022/241423 and/or WO 2022/187805, and/or PCT Application No. PCT/US2023/021799, filed May 11, 2023, which published on Nov. 16, 2023 as International Publication No. WO 2023/220222 which are hereby incorporated herein by reference in their entireties.

The dual-mode interior rearview video mirror may utilize aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety.

The mirror casing may include a bezel portion that circumscribes a perimeter region of the front surface of the reflective element, or the perimeter region of the front surface of the reflective element may be exposed (such as by utilizing aspects of the mirror reflective elements described in U.S. Pat. Nos. 8,508,831 and/or 8,730,553, and/or U.S. Publication Nos. US-2014-0022390; US-2014-0293169 and/or US-2015-0097955, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827,913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular cabin monitoring system, the vehicular cabin monitoring system comprising:

an interior rearview mirror assembly comprising a mirror head attached to and adjustable about a mounting structure, wherein the mounting structure is configured to attach at an interior portion of a vehicle equipped with the interior rearview mirror assembly;

wherein the mirror head accommodates a mirror reflective element;

wherein the mirror reflective element comprises (i) a planar glass substrate, (ii) a transflective mirror reflector disposed at a surface of the planar glass substrate and (iii) a light absorption film;

wherein the light absorption film comprises a polarizer film;

a camera accommodated by the mirror head and operable to capture image data;

wherein the camera views through (i) the planar glass substrate, (ii) the transflective mirror reflector and (iii) the light absorption film;

a light emitter accommodated by the mirror head and electrically operable to emit near infrared (NIR) light;

wherein the light emitter, when electrically operated, emits NIR light that passes through (i) the planar glass substrate, (ii) the transflective mirror reflector and (iii) the light absorption film;

an electronic control unit (ECU) having electronic circuitry and associated software, wherein the electronic circuitry includes an image processor for processing image data captured by the camera;

wherein the light absorption film (i) attenuates greater than 60 percent of visible light that is incident on the light absorption film and transmits less than 40 percent of visible light through the light absorption film and (ii) attenuates less than 30 percent of NIR light that is incident on the light absorption film and transmits greater than 70 percent of NIR light through the light absorption film;

wherein, with the mounting structure attached at the interior portion of the vehicle and when the light emitter is electrically operated to emit NIR light, the camera captures image data representative of NIR light that is emitted by the light emitter and passes through the (i) the planar glass substrate, (ii) the transflective mirror reflector and (iii) the light absorption film and that is reflected back from within an interior cabin of the vehicle and passes back through the (i) the planar glass substrate, (ii) the transflective mirror reflector and (iii) the light absorption film to be incident at the camera; and wherein, via processing at the ECU of image data captured by the camera, the vehicular cabin monitoring system at least one selected from the group consisting of (i) detects an occupant present within the interior cabin of the vehicle and (ii) monitors the occupant present within the interior cabin of the vehicle.

2. The vehicular cabin monitoring system of claim 1, wherein the polarizer film comprises a linear polarizer film having an axis of optical transmission.

3. The vehicular cabin monitoring system of claim 1, wherein the light absorption film comprises (i) a first linear polarizer film having a first axis of optical transmission and (ii) a second linear polarizer film having a second axis of optical transmission.

4. The vehicular cabin monitoring system of claim 3, wherein the first axis of optical transmission of the first linear polarizer film is parallel relative to the second axis of optical transmission of the second linear polarizer film.

5. The vehicular cabin monitoring system of claim 3, wherein the first axis of optical transmission of the first linear polarizer film is perpendicular relative to the second axis of optical transmission of the second linear polarizer film.

6. The vehicular cabin monitoring system of claim 3, wherein the first axis of optical transmission of the first linear polarizer film is at an oblique angle relative to the second axis of optical transmission of the second linear polarizer film.

7. The vehicular cabin monitoring system of claim 6, wherein the first linear polarizer film attenuates greater than 50 percent of visible light that is incident on the first linear polarizer film, and wherein the second linear polarizer film attenuates greater than 50 percent of visible light that is incident on the second linear polarizer film.

8. The vehicular cabin monitoring system of claim 7, wherein, with the first axis of optical transmission of the first linear polarizer film at the oblique angle relative to the second axis of optical transmission of the second linear polarizer film, the light absorption film (i) attenuates greater than 70 percent of visible light that is incident on the light absorption film and transmits less than 30 percent of visible light through the light absorption film and (ii) attenuates less than 20 percent of NIR light that is incident on the light absorption film and transmits greater than 80 percent of NIR light through the light absorption film.

9. The vehicular cabin monitoring system of claim 1, wherein the polarizer film comprises a circular polarizer film.

10. The vehicular cabin monitoring system of claim 1, wherein the polarizer film comprises at least one selected from the group consisting of (i) an iodine type polarizer film and (ii) a dye type polarizer film.

11. The vehicular cabin monitoring system of claim 1, wherein the light absorption film is disposed at a display screen of the mirror reflective element.

12. The vehicular cabin monitoring system of claim 1, wherein the light absorption film (i) attenuates greater than 70 percent of visible light that is incident on the light absorption film and transmits less than 30 percent of visible light through the light absorption film and (ii) attenuates less than 15 percent of NIR light that is incident on the light absorption film and transmits greater than 85 percent of NIR light through the light absorption film.

13. The vehicular cabin monitoring system of claim 1, wherein the light absorption film attenuates less than 10 percent of NIR light that is incident on the light absorption film and transmits greater than 90 percent of NIR light through the light absorption film.

14. The vehicular cabin monitoring system of claim 1, wherein, with the mounting structure attached at the interior portion of the vehicle, the camera captures image data representative of visible light reflected from objects within the interior cabin of the vehicle.

15. The vehicular cabin monitoring system of claim 1, wherein the mirror reflective element comprises an electrochromic mirror reflective element.

16. The vehicular cabin monitoring system of claim 1, wherein the mirror reflective element comprises a prismatic mirror reflective element.

17. The vehicular cabin monitoring system of claim 1, wherein the mirror head accommodates a video display screen, and wherein the camera views through the video display screen.

18. The vehicular cabin monitoring system of claim 17, wherein the light emitter emits NIR light that passes through the video display screen.

19. The vehicular cabin monitoring system of claim 1, wherein, via processing at the ECU of image data captured by the camera, the vehicular cabin monitoring system monitors the occupant present within the interior cabin of the vehicle, and wherein the occupant is a driver of the vehicle and the vehicular cabin monitoring system determines at least one selected from the group consisting of (i) drowsiness of the driver of the vehicle, (ii) attentiveness of the driver of the vehicle and (iii) eye gaze direction of the driver of the vehicle.

20. The vehicular cabin monitoring system of claim 1, wherein the occupant is a passenger of the vehicle, and wherein, via processing at the ECU of image data captured by the camera, the vehicular cabin monitoring system detects the passenger present within the interior cabin of the vehicle.

21. The vehicular cabin monitoring system of claim 1, wherein the interior rearview mirror assembly accommodates the ECU.

22. The vehicular cabin monitoring system of claim 1, wherein the mirror head of the interior rearview mirror assembly accommodates the ECU.

23. The vehicular cabin monitoring system of claim 1, wherein the ECU is disposed at the vehicle remote from the interior rearview mirror assembly.

24. A vehicular cabin monitoring system, the vehicular cabin monitoring system comprising:

an interior rearview mirror assembly comprising a mirror head attached to and adjustable about a mounting structure, wherein the mounting structure is configured to attach at an interior portion of a vehicle equipped with the interior rearview mirror assembly;

wherein the mirror head accommodates a mirror reflective element;

wherein the mirror reflective element comprises (i) a planar glass substrate, (ii) a transflective mirror reflector disposed at a surface of the planar glass substrate and (iii) a light absorption film;

wherein the light absorption film comprises (i) a first linear polarizer film having a first axis of optical transmission and (ii) a second linear polarizer film having a second axis of optical transmission;

wherein the first axis of optical transmission of the first linear polarizer film is at an oblique angle relative to the second axis of optical transmission of the second linear polarizer film;

a camera accommodated by the mirror head and operable to capture image data;

wherein the camera views through (i) the planar glass substrate, (ii) the transflective mirror reflector and (iii) the light absorption film;

a light emitter accommodated by the mirror head and electrically operable to emit near infrared (NIR) light;

wherein the light emitter, when electrically operated, emits NIR light that passes through (i) the planar glass substrate, (ii) the transflective mirror reflector and (iii) the light absorption film;

an electronic control unit (ECU) having electronic circuitry and associated software, wherein the electronic circuitry includes an image processor for processing image data captured by the camera;

wherein the light absorption film (i) attenuates greater than 70 percent of visible light that is incident on the light absorption film and transmits less than 30 percent of visible light through the light absorption film and (ii) attenuates less than 15 percent of NIR light that is incident on the light absorption film and transmits greater than 85 percent of NIR light through the light absorption film;

wherein, with the mounting structure attached at the interior portion of the vehicle and when the light emitter is electrically operated to emit NIR light, the camera captures image data representative of NIR light that is emitted by the light emitter and passes through the (i) the planar glass substrate, (ii) the transflective mirror reflector and (iii) the light absorption film and that is reflected back from within an interior cabin of the vehicle and passes back through the (i) the planar glass substrate, (ii) the transflective mirror reflector and (iii) the light absorption film to be incident at the camera; and wherein, via processing at the ECU of image data captured by the camera, the vehicular cabin monitoring system at least one selected from the group consisting of (i) detects an occupant present within the interior cabin of the vehicle and (ii) monitors the occupant present within the interior cabin of the vehicle.

25. The vehicular cabin monitoring system of claim 24, wherein the first linear polarizer film attenuates greater than 50 percent of visible light that is incident on the first linear polarizer film, and wherein the second linear polarizer film attenuates greater than 50 percent of visible light that is incident on the second linear polarizer film.

26. The vehicular cabin monitoring system of claim 24, wherein the first linear polarizer film comprises at least one selected from the group consisting of (i) an iodine type polarizer film and (ii) a dye type polarizer film.

27. The vehicular cabin monitoring system of claim 24, wherein the mirror reflective element comprises an electrochromic mirror reflective element.

28. The vehicular cabin monitoring system of claim 24, wherein the mirror reflective element comprises a prismatic mirror reflective element.

29. A vehicular cabin monitoring system, the vehicular cabin monitoring system comprising:

an interior rearview mirror assembly comprising a mirror head attached to and adjustable about a mounting structure, wherein the mounting structure is configured to attach at an interior portion of a vehicle equipped with the interior rearview mirror assembly;

wherein the mirror head accommodates a mirror reflective element and a video display screen;

wherein the mirror reflective element comprises (i) a planar glass substrate, (ii) a transflective mirror reflector disposed at a surface of the planar glass substrate and (iii) a light absorption film;

wherein the light absorption film comprises a circular polarizer film, and wherein the light absorption film is disposed at the video display screen;

a camera accommodated by the mirror head and operable to capture image data;

wherein the camera views through (i) the planar glass substrate, (ii) the transflective mirror reflector, (iii) the light absorption film and (iv) the video display screen;

a light emitter accommodated by the mirror head and electrically operable to emit near infrared (NIR) light;

wherein the light emitter, when electrically operated, emits NIR light that passes through (i) the planar glass substrate, (ii) the transflective mirror reflector, (iii) the light absorption film and (iv) the video display screen;

an electronic control unit (ECU) having electronic circuitry and associated software, wherein the electronic circuitry includes an image processor for processing image data captured by the camera;

wherein the light absorption film (i) attenuates greater than 60 percent of visible light that is incident on the light absorption film and transmits less than 40 percent of visible light through the light absorption film and (ii) attenuates less than 30 percent of NIR light that is incident on the light absorption film and transmits greater than 70 percent of NIR light through the light absorption film;

wherein, with the mounting structure attached at the interior portion of the vehicle and when the light emitter is electrically operated to emit NIR light, the camera captures image data representative of NIR light that is emitted by the light emitter and passes through the (i) the planar glass substrate, (ii) the transflective mirror reflector, (iii) the light absorption film and (iv) the video display screen and that is reflected back from within an interior cabin of the vehicle and passes back through the (i) the planar glass substrate, (ii) the transflective mirror reflector, (iii) the light absorption film and (iv) the video display screen to be incident at the camera; and wherein, via processing at the ECU of image data captured by the camera, the vehicular cabin monitoring system at least one selected from the group consisting of (i) detects an occupant present within the interior cabin of the vehicle and (ii) monitors the occupant present within the interior cabin of the vehicle.

30. The vehicular cabin monitoring system of claim 29, wherein the circular polarizer film comprises at least one selected from the group consisting of (i) an iodine type polarizer film and (ii) a dye type polarizer film.

31. The vehicular cabin monitoring system of claim 29, wherein the light absorption film (i) attenuates greater than 70 percent of visible light that is incident on the light absorption film and transmits less than 30 percent of visible light through the light absorption film and (ii) attenuates less than 15 percent of NIR light that is incident on the light absorption film and transmits greater than 85 percent of NIR light through the light absorption film.

32. The vehicular cabin monitoring system of claim 29, wherein the light absorption film attenuates less than 10 percent of NIR light that is incident on the light absorption film and transmits greater than 90 percent of NIR light through the light absorption film.

33. The vehicular cabin monitoring system of claim 29, wherein the mirror reflective element comprises an electrochromic mirror reflective element.

34. The vehicular cabin monitoring system of claim 29, wherein the mirror reflective element comprises a prismatic mirror reflective element.

* * * * *